United States Patent
Sauler et al.

(10) Patent No.: US 6,588,252 B2
(45) Date of Patent: Jul. 8, 2003

(54) DIAGNOSTIC METHOD FOR RAPIDLY DETECTING ERRONEOUS OPERATION OF A KNOCK SENSOR OF AN INTERNAL COMBUSTION ENGINE

(75) Inventors: Juergen Sauler, Stuttgart (DE); Axel Heinstein, Wimsheim (DE); Carsten Kluth, Stuttgart (DE); Werner Haeming, Neudenau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/940,197

(22) Filed: Aug. 27, 2001

(65) Prior Publication Data

US 2002/0050270 A1 May 2, 2002

(30) Foreign Application Priority Data

Sep. 1, 2000 (DE) .......................................... 100 43 501

(51) Int. Cl.[7] .............................................. G01L 23/22
(52) U.S. Cl. .................................. 73/35.03; 123/406.16
(58) Field of Search ........................ 123/406.14, 406.16, 123/479; 73/117.2, 117.3, 118.1, 35.03–35.06

(56) References Cited

U.S. PATENT DOCUMENTS

| 4,264,972 | A | * | 4/1981 | Drullman et al. ........... 375/292 |
| 5,428,986 | A | * | 7/1995 | Dietsche et al. ........... 73/35.04 |
| 5,517,969 | A | | 5/1996 | Unland et al. ............... 123/425 |
| 6,226,576 | B1 | * | 5/2001 | Torno et al. .................... 701/31 |
| 6,317,681 | B2 | * | 11/2001 | Elliott et al. ............ 123/406.16 |
| 2001/0042398 | A1 | * | 11/2001 | Sloboda ...................... 73/35.04 |
| 2002/0116150 | A1 | * | 8/2002 | Franke et al. ................ 702/185 |

* cited by examiner

Primary Examiner—Daniel S. Larkin
Assistant Examiner—Rose M. Miller
(74) Attorney, Agent, or Firm—Michael J. Striker

(57) ABSTRACT

In the diagnostic method for detecting erroneous operation of a knock sensor of an internal combustion engine an actual reference level is formed from knock sensor signals generated by the knock sensor; then two minimum knock detection thresholds consisting of rotation speed values are defined and compared with rotation speed to test whether or not rotation speed exceeds each minimum knock detection threshold; the reference level is then compared with at least one of an upper reference level threshold and a lower reference level threshold, but only with the upper reference level threshold when a lower minimum knock detection threshold is exceeded, and a diagnostic signal indicative of a knock sensor fault or error is generated when the reference level exceeds the upper reference level threshold or falls below the lower reference level threshold, if and only if engine rotation speed exceeds at least one of the minimum knock detection thresholds.

2 Claims, 2 Drawing Sheets

DIAGNOSTIC METHOD FOR RAPIDLY DETECTING ERRONEOUS OPERATION OF A KNOCK SENSOR OF AN INTERNAL COMBUSTION ENGINE

BACKGROUND OF THE INVENTION

1. Field of the Invention

The present invention relates to a diagnostic process for use in evaluation of sensors signals, especially knock sensor output signals of a knock sensor of an internal combustion engine, and, more particularly, to a diagnostic process for evaluation of sensor signals with an evaluation device that forms a reference level from the output signals, which is compared with an upper and/or lower limiting value for error analysis, which establishes the existence of an error when the actual reference level exceeds the preset upper limiting value or falls below the present lower limiting value and which performs the diagnostic process only when a minimum detection threshold has been exceeded.

2. Description of Related Art

In sensors, for example in knock sensors, which are used for knock detection and thus for controlling knock in an internal combustion engine, it is known that a reliable diagnostic process must be performed, which guarantees that erroneous operations of the sensor are detected and faulty detection, for example erroneous detection of knock is reliably prevented.

If knock sensors are, for example, associated with the respective cylinders of an internal combustion engine, they produce output signals, which, after appropriate signal preparation and a special evaluation process, detect whether or not knock is occurring in the concerned cylinders, also whether or not knocking composition is occurring or not. Knock is a matter of undesirable combustion events, which should be avoided.

The reference PCT DE 94/01041 describes a process of knock detection including a diagnostic process. A rotation-speed-dependent standard reference level is formed by the control unit of the internal combustion engine in this known process, as is generally common in methods for knock detection, from the output signal of a knock sensor or the signals of knock sensors, especially structure-borne sound sensors. Rotation-speed-dependent reference level thresholds are formed according to this reference level. A respective upper and a lower reference level threshold is detected. Both reference level thresholds are input to the electronic memory of the control unit of the internal combustion engine as characteristic curves. The formation of the reference level occurs so that it corresponds to the sound level of the internal combustion engine during knock-free operation. The reference level or the standard reference level derived from it is also obtained with the help of an integration of the outer signals of the knock sensors at those conditions, at which not knock is detected, for example within a predetermined measurement window.

During actual knock detection in the known processes each actual standard reference level is compared with both speed-dependent reference level thresholds. Erroneous operation is detected when there is a predetermined deviation from the actual normalized reference level. When the reference level falls below the lower reference level threshold, failure of the knock sensor is established, since in this case no signal can reach the evaluation device. When the reference level exceeds the upper reference level threshold, erroneous operation of the knock sensor is established.

In order to maintain a reliable distance from the high basic noise level, which is caused by noise and irradiation in the knock sensor channel, the diagnostic process is performed above a certain minimum rotation speed in the known process. This threshold is selected so that the spacing of the standard reference level from the basic noise is so large that a reliable testing process can be performed.

SUMMARY OF THE INVENTION

It is an object of the present invention to provide an improved process for evaluation of sensors signals, especially knock sensor output signals of a knock sensor of an internal combustion engine, which can be performed reliably at comparatively lower engine rotation speeds.

This object and others, which will be made more apparent hereinafter, are attained in a diagnostic process for evaluation of sensor signals with an evaluation device that forms a reference level from the output signals, which is compared with an upper and/or lower limiting value or threshold for error analysis, which establishes the existence of an error when the actual reference level exceeds the preset upper limiting value or threshold or falls below the present lower limiting value or threshold and which performs the diagnostic process only when a minimum detection threshold has been exceeded.

According to the invention the minimum detection threshold can take two different limiting or threshold values.

The process according to the invention has the advantage that the diagnostic process can even be performed at clearly smaller engine rotation speeds than the current process according to the state of the art. Because of that feature faulty knock sensors or erroneous operation can be detected earlier so that motor damage can be reliably avoided.

Additional features and advantages are described and claimed in the appended dependent claims.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
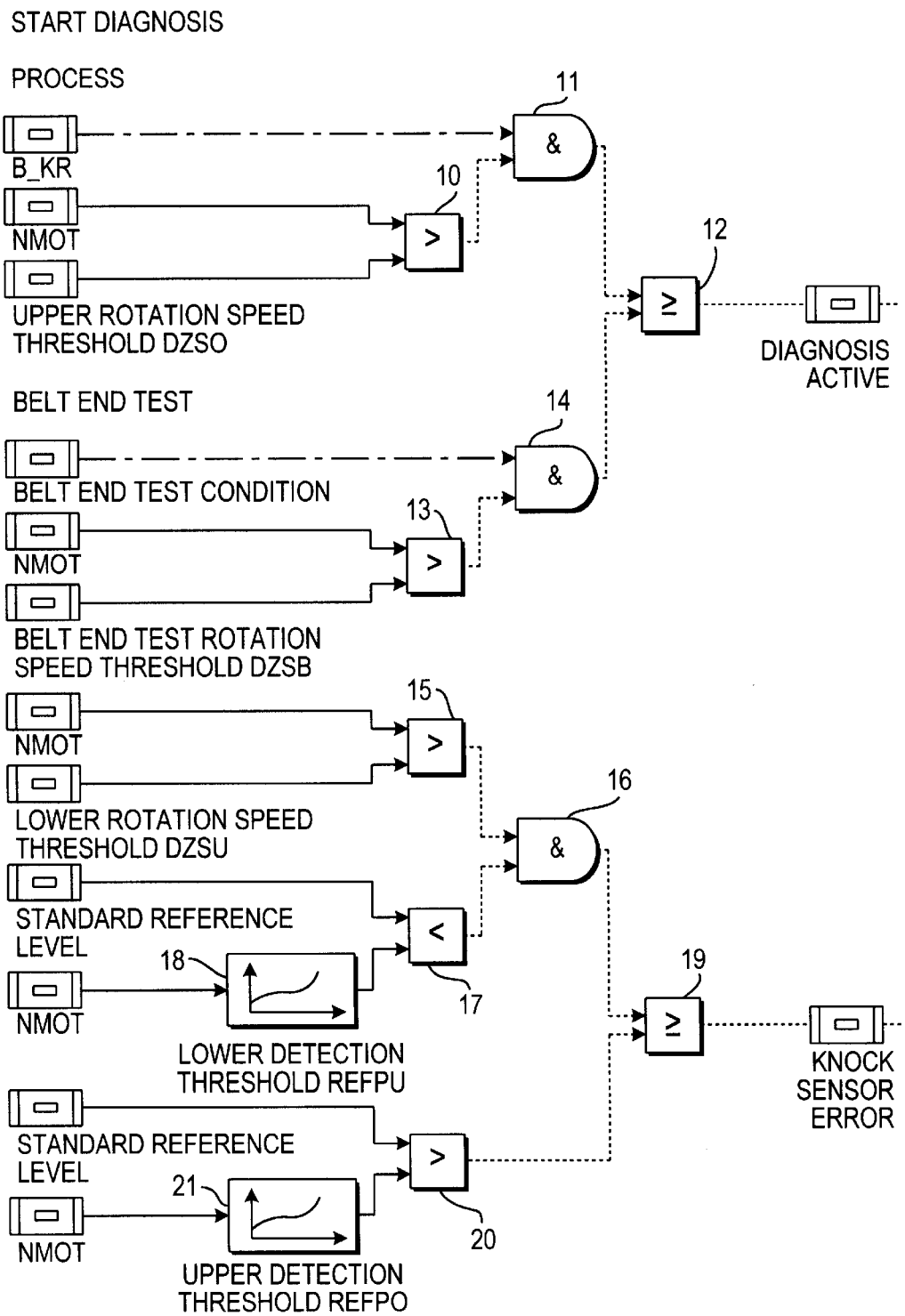
FIG. 1 is a block diagram of a knock evaluation process according to the invention.

One embodiment of the inventive diagnostic process for a knock sensor is shown in FIG. 1. For diagnosis of the knock sensor the standard reference level, also the reference level considering the amplification step is compared with an upper and lower applicable detection threshold. When the standard reference level exceeds the upper detection threshold or is less than the lower detection threshold, an error or fault is detected. The exact procedure for forming the standard reference level in a device for knock detection is, for example, described in the reference PCT/DE 94/01041 and will not be described in further detail here.

The noise level for the lower detection threshold at low rotation speed due to electromagnetic radiation and thus the smallest detectable noise is very small. In order to guarantee reliable error detection, the diagnostic process can be started at an applicable rotation speed threshold. An error is detected comparatively late in the known process because of this comparatively high rotation speed threshold.

In the embodiment shown in the block diagram in FIG. 1 in the diagnostic process, which for example runs in the control unit of the internal combustion engine, the following procedure takes place: For start of the diagnostic process whether or not the motor rotation speed or engine speed nmot is greater than an upper rotation speed threshold DZSO is tested in block 10. If this is the case and also the condition that the knock control is active is satisfied, an appropriate signal is produced at the output of the AND-gate 11. This signal is fed to the block 12, at whose output the condition "diagnosis active" appears, in so far as its content is greater or less than 1.

A belt end test is still performed besides the diagnostic start test. This belt end test determines in block 12, whether or not the motor rotation speed nmot is greater than a second rotation speed threshold DZSB. When this comparison shows that the rotation speed nmot is greater than the belt end test rotation speed threshold DZSB, appropriate information entities are sent to the AND-gate 14. In so far as the condition "Belt End Test" is satisfied and it is determined that the motor rotation speed is greater than the second rotation speed threshold DZSB, the condition "Diagnosis active" is output by block 12 and the knock sensor diagnostic process is performed.

In so far as the condition "Diagnosis active" is present, whether or not the motor rotation speed is above a lower speed threshold DZSU is tested in block 15. If this condition is fulfilled, the appropriate information is conducted to the AND-gate 16. In block 17 whether or not the standard reference level REFPN is less than a lower reference level threshold REFPU is tested. This lower reference level threshold REFPU is formed in a rotation-speed-dependent manner in block 18. For example, a process runs for formation of the reference level threshold according to the reference PCT/DE 94/01041 in connection with a calculation of the reference levels.

If the standard reference level REFPN is determined to be greater than the lower threshold REFPU in block 17, a suitable signal is fed to block 16. Block 16 is an AND-gate, which only outputs a yes-output signal (high) when the condition tested in block 15 is fulfilled, and also the motor rotation speed is larger than the lower rotation speed threshold, also if the standard reference level REFPN is less than the lower threshold REFPU.

The information that a knock sensor error is present is output from the block 19, when the output of the block 16 is active and when the block 20 signals that the standard reference level REFPN is larger than the upper threshold value REFPO formed in the block 21. This upper threshold value REFPO is formed similarly in a rotation-speed-dependent manner in the block 21.

By the procedure described in FIG. 1, in which two separate rotation speed thresholds DZSO and DZSU for the upper and lower detection threshold are evaluated, the diagnostic process for the upper detection threshold can already be performed at considerably lower rotation speed. Because of this feature the knock sensor faults can be detected earlier and thus motor damage can be more reliably prevented, since the control unit, in which the diagnostic process runs and/or the error detection according to FIG. 1, can perform an ignition angle shift in a timely manner.

In order to permit automatic knock sensor detection in the scope of the belt end test, the load threshold is completely lifted in this case. One single rotation speed threshold is used for the belt end test. This rotation speed threshold DZSB must be above the standard rotation speed threshold in order to permit a reliable detection by the knock sensor.

Figure 2:
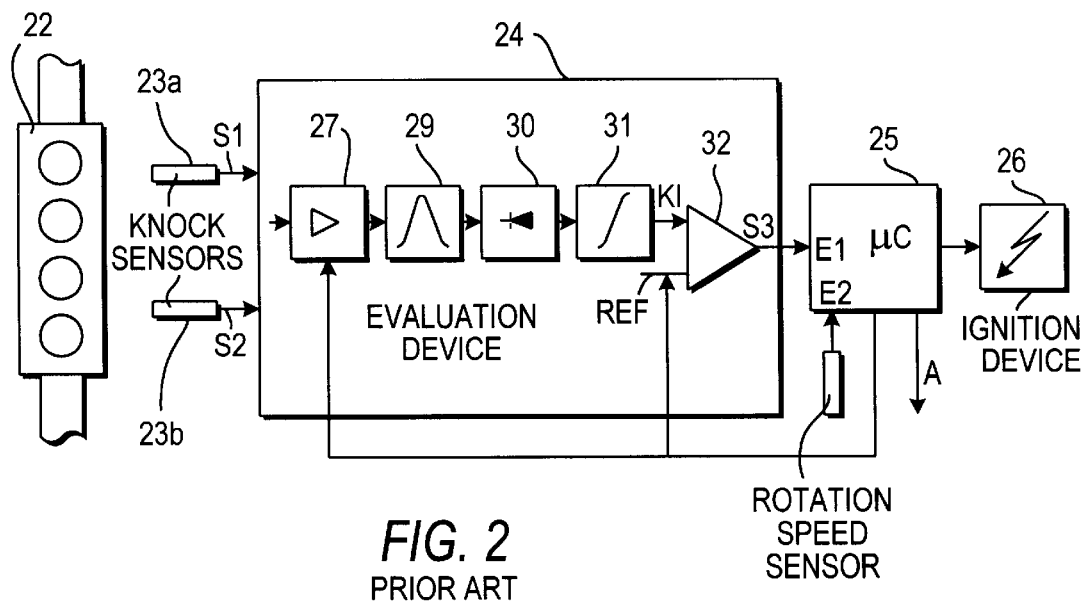
FIG. 2 is a block diagram of an apparatus described in PCT/DE 94/01041, which is also in a position to perform the process according to the invention shown in FIG. 1.

FIG. 2 shows a device for knock detection, in which the previously described evaluation process can run. This knock detection device is already known and described in PCT/DE 94/01041.

For illustration of this device for knock detection two knock sensors 23a and 23b are provided for the only schematically illustrated internal combustion engine 22. The knock sensors 23a and 23b are arranged at predetermined locations in the internal combustion engine. The knock sensors 23a and 23b supply the signals S1 and S2 to the evaluation unit 24, which is connected by means of an input E1 with a microprocessor or computer 25. The computer is part of an unshown control unit of the internal combustion engine. Additional signals, for example a rotation speed signal nmot, can be supplied to the computer 25 by means of an additional input E2. The computer 25 controls the ignition stage 26 of the internal combustion engine and/or additional devices, such as injection valves or the like, or outputs appropriate signals at the output A, according to the input signals. The entire evaluation circuit can be completely integrated into the computer 25 of the control unit of the internal combustion engine.

The evaluation circuit 24 comprises, for example, at least one amplifier 27 with an adjustable amplification factor, to which the output signal S1 or S2 of the knock sensors is alternately supplied e.g. by means of a multiplexer. In the following bandpass filter 29 and demodulation circuit 30, e.g. a rectifier, the signals from the knock sensor are further process and integrated in the integrator 31. The integrated signals and/or the integrated values produced are designated KI. The value of KI is compared in a comparator 32 with the reference level. The comparison result indicates that knock may be occurring when the value of KI exceeds the reference level REF by a predetermined amount.

The comparator 32, or an additional comparison means not shown in FIG. 2, which is supplied both signals KI and REF, is also used for the error or fault detection or diagnostic process. This latter process runs according to the method described in FIG. 1.

Figure 3:
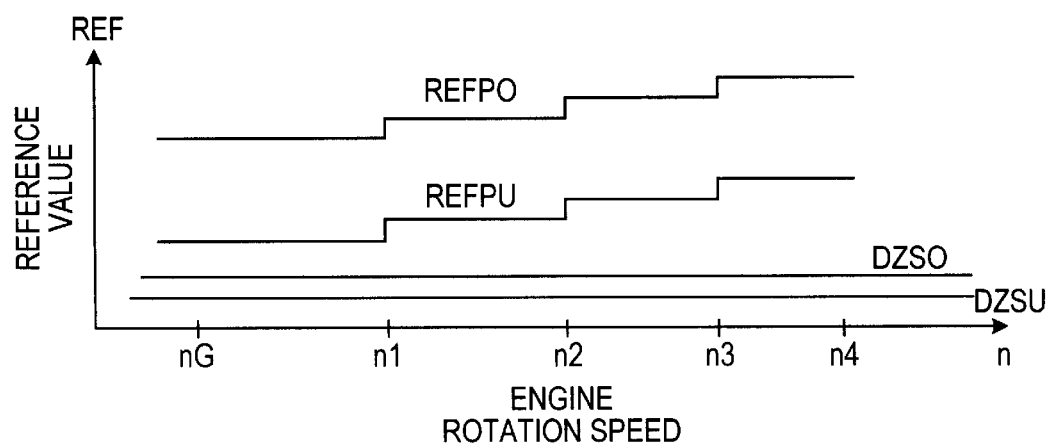
FIG. 3 is a graphical illustration showing the change of reference levels as a function of engine rotation speed.

FIG. 3 shows an example of the behavior of the upper and lower reference level thresholds REFPO, REFPU versus the rotation speed nmot and a minimum reference level. The advantages of the method according to the invention are obtained because of the splitting of the minimum reference level into the two different reference levels DZSO and DZSU.

The disclosure in German Patent Application 100 43 501.7 of Sep. 1, 2000 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a diagnostic process, for use in evaluation of sensors signals, especially knock sensor output signals of a knock sensor of an internal combustion engine, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A diagnostic method for detecting faulty or erroneous operation of a knock sensor of an internal combustion engine, said diagnostic method comprising the steps of:
   a) forming an actual reference level from knock sensor signals generated by the knock sensor;
   b) forming two minimum knock detection thresholds consisting of engine rotation speed values;
   c) testing whether or not engine rotation speed exceeds each of said minimum knock detection thresholds;
   d) comparing said actual reference level with at least one of a predetermined upper reference level threshold and a predetermined lower reference level threshold, but only with said upper reference level threshold when a lower one of said minimum knock detection thresholds is exceeded; and
   e) generating a diagnostic signal indicative of a knock sensor fault or error when said actual reference level exceeds said predetermined upper reference level threshold or falls below said predetermined lower reference level threshold, if and only if said engine rotation speed exceeds at least one of said minimum knock detection thresholds.

2. A diagnostic method for detecting faulty or erroneous operation of a knock sensor of an internal combustion engine, said diagnostic method comprising the steps of:
   a) forming an actual reference level from knock sensor signals generated by the knock sensor;
   b) forming two minimum knock detection thresholds consisting of engine rotation speed values;
   c) performing a belt end test to determine whether or not engine rotation speed exceeds another minimum knock detection threshold that is greater than an upper one of said engine rotation speed values;
   d) comparing said engine rotation speed with said upper one of said engine rotation speed thresholds to determine if knock control is active;
   e) if said knock control is active, comparing said actual reference level with at least one of a predetermined upper reference level threshold and a predetermined lower reference level threshold; and
   f) generating a diagnostic signal indicative of a knock sensor fault or error when said actual reference level exceeds said predetermined upper reference level threshold or falls below said predetermined lower reference level threshold, if and only if said engine rotation speed exceeds a lower one of said minimum knock detection thresholds.

* * * * *